April 4, 1950

F. H. GUSDORF ET AL 2,502,717

ANTIVIBRATIONAL MOUNTING FOR A VARIABLE TUNING CONDENSER ON A RADIO APPARATUS

Filed April 23, 1946

F. H. Gusdorf, J. Poelma,
& R. Kuperus
INVENTORS

BY
Wenderoth, Lind & Ponack
ATTORNEYS

Patented Apr. 4, 1950 2,502,717

UNITED STATES PATENT OFFICE 2,502,717

ANTIVIBRATIONAL MOUNTING FOR A VARIABLE TUNING CONDENSER ON A RADIO APPARATUS

Frederik Hendrik Gusdorf, Jacob Poelma, and Reinder Kuperus, Eindhoven, Netherlands, assignors, by mesne assignments, to Hartford National Bank and Trust Company, Hartford, Conn., as trustee Application April 23, 1946, Serial No. 664,180
In the Netherlands September 3, 1942

Section 1, Public Law 690, August 8, 1946
Patent expires September 3, 1962

7 Claims. (Cl. 179—171)

Figure 1:
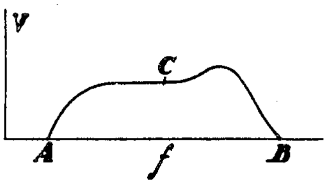

The invention relates to apparatus comprising a device such as a radio receiver for amplifying and acoustically reproducing electrical oscillations and at least one high-frequency oscillatory circuit including a variable tuning condenser supported by elements resilient in all directions and mounted on the said radio receiver.

Devices for amplifying such aforesaid electrical oscillations comprise various components such as condensers as already mentioned above, tubes and coils which are sensitive, though to an unequal degree, to mechanical or acoustic vibrations, that is to say that due to their effect on these components these vibrations cause disturbances in the satisfactory operation of these devices. With such devices which comprises a source of acoustic vibrations, that is a loudspeaker, a loud howling noise, the so-called microphonic howl may be caused. The disturbances caused by the vibrations can only be eliminated by making the components less sensitive to vibrations. Two groups of steps have been indicated to that end. The first group relates to the construction and the second to the mounting of the components. The steps according to the invention belong to the last-mentioned group.

It is known to obtain a so-called "antivibrating" suspension of a device by securing it to a supporting structure, by means of resilient elements. It has been found that this manner of mounting does not answer expectations since trouble is experienced from resonance phenomena.

The mechanical vibratory system formed by the device or the component and the resilient elements has a resonance frequency. In the frequency range around this frequency the amplitude of the resiliently mounted component becomes a multiple of the amplitude of the disturbing vibration instead of being a fraction thereof as is the case with higher frequencies. Attempts made to avoid these resonance phenomena by providing additional means of damping result in that at some distance beyond the resonance frequency the sensitiveness increases again.

The resilient elements themselves also have natural frequencies of which many are located in the frequency range under consideration. In the region located in the neighborhood of such a natural frequency the amplitude of the resiliently mounted component becomes much larger than the amplitude of the forced oscillation.

The invention has for its object to eliminate these troublesome resonance phenomena. According to the invention, the resonance frequency of the mechanical vibratory system formed by the component and the resilient elements is located below the fidelity curve and the resonance frequencies of the resilient elements are substantially located beyond the fidelity curve of the electric device. By the fidelity curve of a device is meant hereinafter the amplification as a function of the frequency. On the side of the comparatively low frequencies as well as on the side of the higher frequencies this curve is limited by frequency ranges in which the amplification has fallen below the lowest value that can be used.

By ensuring that the resonance frequency of the system is located below the fidelity curve of the device, that is to say in the frequency range for which the device practically does not amplify, no trouble is experienced from this resonance. The region from 20 to 30 cycles per second has proved to be particularly suitable for this purpose. In contradistinction to the known devices with which attempts are made to avoid the production of a marked resonance frequency by providing damping for the movement of the resiliently mounted component it is now also possible without any objection to reduce the damping of the mechanical vibratory system as far as possible. The result thereof is that the sensitiveness to vibrations of the structure within the fidelity curve is still more reduced.

By ensuring that substantially all the natural frequencies of the resilient elements are located beyond the fidelity curve of the electric device these natural frequencies also cause no trouble.

The two above-mentioned steps can generally not be taken simultaneously. In order to ensure that the natural frequency of the mechanical vibratory system formed by the component and the resilient elements on which it is mounted are located below the above-mentioned limit, fairly slack springs are necessary. In order to ensure that the springs have high natural frequencies the elasticity must be large or the mass must be small. According to the invention, this condition is fulfilled in a simple manner by the fact that each of the resilient elements consists of a curved resilient supporting arm in the shape of a wire.

A further particular advantage is that no use is made of rubber so that no trouble is experienced from harmful phenomena of ageing such as drying up, the device having consequently a very long life.

The mass of the resilient elements may be made particularly small by dimensioning these elements in such manner that they are heavily strained. It is advisable to proceed therewith so far that the largest material strain which occurs in the springs in the ordinary condition of operation exceeds 70% of the limit of fatigue of the material.

In one practical form of construction the resilient elements substantially have the shape of an arc of a circle.

The mass of the resilient elements to be utilized increases with the weight of the component to be mounted. By means of a suitable construction this component is therefore kept as small as possible. Notably the resilient elements are secured at one end directly to the resiliently mounted component.

In every direction the resilient elements possess the desired properties of elasticity and they may consequently be secured in any desired manner between the supporting plate and the component that is to be resiliently mounted. A simple and surveyable structure which takes up little room is obtained, however, if the planes in which the resilient elements are located are perpendicular to the supporting plate to which the resiliently mounted component is secured and if each resilient element is parallel to that side of the component to which it is attached.

The attachment of the resilient elements, which must be rigid, may be brought about in different ways. Thus, for example, the ends may be bent so as to form eyelets which are secured, with the aid of screws or rivets, to the base plate and to the component to be resiliently mounted. In order to reduce the costs of this attachment and to obtain a simpler structure a few resilient elements may be formed from one length of wire and may have common means of attachment. The element to be resiliently mounted generally has the shape of a right-angled parallelepiped. In this case, for example, two resilient elements are secured to any of the four lateral faces, in which event it is advantageous to form the resilient elements in pairs out of one length of wire.

In order to ensure that the resilient elements are not exposed to great deterioration, for example due to the transport of the device, the component may be provided with a locking device with the aid of which it can be fixed with respect to the supporting plate. This locking device may be based upon any known construction usually employed for such devices. It may consist, for example, of holes which are provided in the resiliently mounted component and in which are provided screws with the aid of which the component can be rigidly secured to the base plate.

The invention will be explained more fully with reference to the accompanying drawing wherein Fig. 1 represents a fidelity curve.

Figs. 2, 2*a* and 3*b*, and 4*a* and 4*b* represent, by way of example, three resilient elements constructed according to the invention.

Figures 4A, 4B, 5:
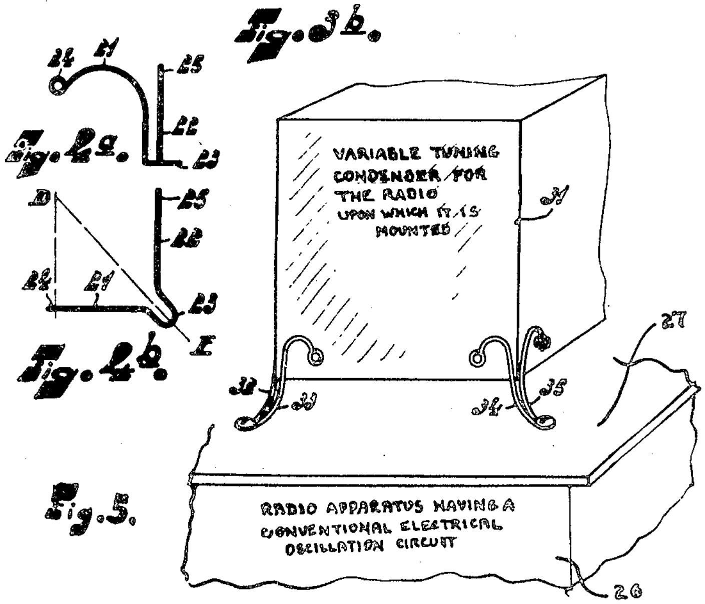

Fig. 5 shows a radio receiving apparatus upon which a variable electric condenser is resiliently mounted in order to avoid microphony.

Figure 2:
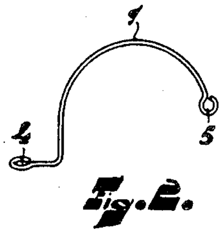

In Fig. 1 the amplification *v* of oscillations, which is brought about by a radio apparatus which forms the subject-matter of the present invention, is represented as a function of the frequency *f* of these oscillations. The curve ABC is consequently the fidelity curve. For the frequencies located below the fidelity curve, that is to say below A, and for those located above the fidelity curve, that is to say beyond B, the device is practically inoperative. According to the invention, care is consequently taken to ensure that the natural frequency of the mechanical vibratory system formed by the component and the resilient elements is located below A and that the natural frequencies of the resilient elements are substantially located above B. The resilient element 1 represented in Fig. 2 is made of spring steel wire and is curved so as to take approximately the shape of an arc of a circle. The two ends are bent to form eyelets 4 and 5 so that with the aid of screw bolts or rivets the element 1 can be secured at the one end to the supporting plate and at the other end to the component to be resiliently mounted.

Figures 3A, 3B:

Fig. 3 represents two resilient elements 11 and 12 which are formed from one length of wire and which have a common place of attachment 13. Fig. 3*a* is a lateral elevation and Fig. 3*b* is a plan. Such a combination of elements should preferably be secured at the place of attachment 13 to the centre of any of the sides of the component to be resiliently mounted, the eyelets 14 and 15 being secured in this case to the base plate.

The resilient elements 21 and 22 in Figs. 4*a* and 4*b* are connected to one another at their common place of attachment 23. Fig. 4*a* is a lateral elevation and Fig. 4*b* is a plan. The elements 21 and 22 are congruent so that the line D—E drawn in Fig. 4*b* represents a plane of symmetry of the structure. Such a symmetry is, however, not necessary. The shown combination of resilient elements is preferably secured, by means of the eyelets 24 and 25, to two successive lateral faces of the component to be resiliently mounted, which faces form a right angle with one another, and, with the aid of the common eyelet 25, to the base plate.

In Fig. 5 a condenser 31, which for convenience is represented here as a right-angled parallelepiped and which forms part of a device for amplifying electrical oscillations (shown diagrammatically by 26), is secured to a supporting plate 27 through the intermediary of resilient elements which are placed at the angles and which are connected to one another in pairs. In the figure the elements 32 to 35 inclusive are visible. In this form of construction the natural frequency of the mechanical vibratory system formed by the condenser 31 and the resilient elements is located between 20 and 30 cycles per second.

Devices comprising resiliently mounted components according to the invention are characterized by simplicity, robustness and great freedom from microphonic howl.

What we claim is:

1. A device for amplifying and acoustically reproducing electrical oscillations without microphonic effect comprising at least one high frequency circuit having a frequency above the audio range, a variable tuning condenser for said high frequency circuit, said variable tuning condenser being supported on said device by elements resilient in every direction, said variable tuning condenser and said resilient elements constituting a mechanical vibratory system having a resonance frequency the value of which lies below the frequency range of the device in which said microphonic effect may occur, and said resilient elements each having a resonance frequency above said frequency range of said device.

2. A device for amplifying and acoustically reproducing electrical oscillations without microphonic effect comprising at least one high frequency circuit having a frequency above the audio range, a variable tuning condenser for said high frequency circuit, said variable tuning condenser being supported on said device by elements resilient in every direction, said resilient elements being constituted at least in part by parts of loops of material, said variable tuning condenser and said resilient elements constituting a mechanical vibratory system having a resonance frequency the value of which lies below the frequency range of said device in which said microphonic effect may occur, and said resilient elements each having a resonance frequency above said frequency range of said device.

3. The combination set forth in claim 2 wherein the resilient elements are of a material dimensioned in relation to the weight of the variable tuning condenser supported thereby so as to be so heavily stressed that the largest material strain occurring in said resilient elements in the normal operating condition exceeds 70° of the limit of fatigue of said material of said resilient elements.

4. The combination set forth in claim 2 wherein said parts of loops are arcs of a circle.

5. A device for amplifying and acoustically reproducing electrical oscillations without microphonic effect comprising at least one high frequency circuit having a frequency above the audio range, a variable tuning condenser for said high frequency circuit, said variable tuning condenser being supported on said device by elements resilient in every direction, said resilient elements being secured at one end to said resiliently mounted condenser, said variable tuning condenser and said resilient elements constituting a mechanical vibratory system having a resonance frequency the value of which lies below the frequency range of said device in which said microphonic effect may occur, and the resilient elements each having a resonance frequency above said frequency range of said device.

6. A device for amplifying and acoustically reproducing electrical oscillations without microphonic effect comprising at least one high frequency circuit having a frequency above the audio range, a variable tuning condenser for said high frequency circuit, a supporting plate mounted horizontally on said device, said variable condenser being attached to and supported on said supporting plate by elements resilient in every direction, each of said resilient elements being secured at one end to surfaces of said resiliently mounted condenser, said resilient elements being secured at one end to surfaces of said resiliently mounted condenser, said resilient elements being located in planes which are perpendicular to said supporting plate, each of said resilient elements being parallel to that surface of said condenser to which it is secured, said variable tuning condenser and said resilient elements constituting a mechanical vibratory system having a resonance frequency the value of which lies below the frequency range of the device in which said microphonic effect may occur, and said resilient elements each having a resonance frequency above said frequency range of said device.

7. The combination set forth in claim 6 wherein at least two of said resilient elements, which are secured at one end to surfaces of said condenser, are constituted by a single length of bent wire and have a common means of attachment to said supporting plate.

FREDERIK HENDRIK GUSDORF.
JACOB POELMA.
REINDER KUPERUS.

REFERENCES CITED

The following references are of record in the file of this patent:

UNITED STATES PATENTS

| Number | Name | Date |
|---|---|---|
| 1,631,100 | Lauritsen | May 31, 1927 |
| 1,637,864 | Kolster | Aug. 2, 1927 |
| 2,072,610 | Van Urk | Mar. 2, 1937 |
| 2,152,589 | Haas et al. | Mar. 28, 1939 |